United States Patent
South

(10) Patent No.: US 9,247,408 B2
(45) Date of Patent: Jan. 26, 2016

(54) INTERACTIVE EMERGENCY INFORMATION AND IDENTIFICATION

(71) Applicant: John A. South, McLean, VA (US)

(72) Inventor: John A. South, McLean, VA (US)

(73) Assignee: PATROCINIUM SYSTEMS LLC, McLean, VA (US)

( * ) Notice: Subject to any disclaimer, the term of this patent is extended or adjusted under 35 U.S.C. 154(b) by 143 days.

(21) Appl. No.: 14/060,280

(22) Filed: Oct. 22, 2013

(65) Prior Publication Data

US 2015/0111523 A1  Apr. 23, 2015

(51) Int. Cl.
*H04W 4/22* (2009.01)

(52) U.S. Cl.
CPC ....................... *H04W 4/22* (2013.01)

(58) Field of Classification Search
CPC .............................. H04W 4/22; H04W 76/007
See application file for complete search history.

(56) References Cited

U.S. PATENT DOCUMENTS

| | | | |
|---|---|---|---|
| 5,563,931 A | 10/1996 | Bishop et al. | |
| 5,894,591 A | 4/1999 | Tamayo | |
| 6,084,510 A | 7/2000 | Lemelson et al. | |
| 6,509,833 B2 | 1/2003 | Tate | |
| 6,745,021 B1 | 6/2004 | Stevens | |
| 6,816,878 B1 | 11/2004 | Zimmers et al. | |
| 6,882,307 B1 | 4/2005 | Gifford | |
| 6,882,837 B2 | 4/2005 | Fernandez et al. | |
| 6,885,936 B2 | 4/2005 | Yashio et al. | |
| 7,046,140 B2 | 5/2006 | Adamczyk et al. | |
| 7,071,821 B2 | 7/2006 | Adamczyk et al. | |
| 7,109,859 B2 | 9/2006 | Peeters | |
| 7,194,249 B2 | 3/2007 | Phillips et al. | |
| 7,233,781 B2 | 6/2007 | Hunter et al. | |
| 7,301,450 B2 | 11/2007 | Carrino | |
| 7,308,246 B2 | 12/2007 | Yamazaki et al. | |
| 7,348,882 B2 | 3/2008 | Adamczyk et al. | |
| 7,433,672 B2 | 10/2008 | Wood | |
| 7,558,558 B2 | 7/2009 | Langsenkamp et al. | |
| 7,593,740 B2 | 9/2009 | Crowley et al. | |

(Continued)

FOREIGN PATENT DOCUMENTS

| | | |
|---|---|---|
| WO | WO 2011/059308 A2 | 5/2011 |
| WO | WO 2013/087719 A1 | 6/2013 |

(Continued)

OTHER PUBLICATIONS

"Livesafe/Safety-Related Mobile Technology", http://www.livesafemobile.com ; Oct. 31, 2014, 2 pages.

(Continued)

*Primary Examiner* — Mehmood B Khan
(74) *Attorney, Agent, or Firm* — Haynes and Boone, LLP

(57) ABSTRACT

Provided is a method for interactive emergency information and identification. The method may comprise receiving a notification concerning an emergency situation. The notification may include a location of the emergency situation. A geo-fence associated with the location of the emergency situation can be defined based on the location of the emergency situation. Additionally, location information associated with the locations of a plurality of user devices is received, and a position of an individual within the geo-fence is determined based on the location information of the user device associated with individual. The individual may be informed about the emergency situation via a user interface of the user device. Furthermore, functionality for a user to give feedback is provided to the individual.

26 Claims, 10 Drawing Sheets

(56) References Cited

U.S. PATENT DOCUMENTS

| | | |
|---|---|---|
| 7,848,765 B2 | 12/2010 | Phillips et al. |
| 7,920,679 B1 | 4/2011 | Naim et al. |
| 7,924,149 B2 | 4/2011 | Mendelson |
| 8,045,954 B2 | 10/2011 | Barbeau et al. |
| 8,073,422 B2 | 12/2011 | Langsenkamp et al. |
| 8,095,610 B2 | 1/2012 | Gould et al. |
| 8,103,239 B2 | 1/2012 | Yamazaki et al. |
| 8,126,479 B2 | 2/2012 | Morrison |
| 8,126,480 B2 | 2/2012 | Morrison |
| 8,145,183 B2 | 3/2012 | Barbeau et al. |
| 8,190,118 B2 | 5/2012 | Sennett et al. |
| 8,204,525 B2 | 6/2012 | Sennett et al. |
| 8,301,112 B2 | 10/2012 | Morrison |
| 8,312,112 B2 | 11/2012 | Stremel et al. |
| 8,320,931 B2 | 11/2012 | Ward et al. |
| 8,351,297 B2 | 1/2013 | Lauder et al. |
| 8,385,956 B2 | 2/2013 | Sennett et al. |
| 8,412,147 B2 | 4/2013 | Hunter et al. |
| 8,442,482 B2 | 5/2013 | Maier et al. |
| 8,442,807 B2 | 5/2013 | Ramachandran |
| 8,458,067 B2 | 6/2013 | Arguelles et al. |
| 8,531,293 B2 | 9/2013 | Putz |
| 8,532,607 B2 | 9/2013 | Sennett et al. |
| 8,542,599 B1 | 9/2013 | Pons et al. |
| 8,548,423 B2 | 10/2013 | Rao |
| 8,552,886 B2 | 10/2013 | Bensoussan |
| 8,594,015 B2 | 11/2013 | Dunn et al. |
| 8,594,707 B2 | 11/2013 | Morrison |
| 8,612,278 B1 | 12/2013 | Ashley, Jr. et al. |
| 8,614,631 B2 | 12/2013 | Pinhanez |
| 8,624,727 B2 | 1/2014 | Saigh et al. |
| 8,660,518 B2 | 2/2014 | Sennett et al. |
| 8,660,520 B2 | 2/2014 | Felt et al. |
| 8,665,089 B2 | 3/2014 | Saigh et al. |
| 8,725,107 B2 | 5/2014 | Brok Den et al. |
| 2006/0223494 A1 | 10/2006 | Chmaytelli et al. |
| 2007/0159322 A1 | 7/2007 | Garratt Campbell |
| 2007/0202927 A1 | 8/2007 | Pfleging et al. |
| 2007/0219420 A1 | 9/2007 | Moore |
| 2008/0139165 A1 | 6/2008 | Gage et al. |
| 2008/0275308 A1 | 11/2008 | Moore |
| 2009/0005019 A1 | 1/2009 | Patel et al. |
| 2009/0042546 A1 | 2/2009 | McClendon |
| 2009/0172131 A1 | 7/2009 | Sullivan |
| 2009/0309742 A1 | 12/2009 | Alexander et al. |
| 2010/0159871 A1 | 6/2010 | Tester |
| 2010/0305806 A1 | 12/2010 | Hawley |
| 2011/0063138 A1 | 3/2011 | Berkobin et al. |
| 2011/0238300 A1 | 9/2011 | Schenken |
| 2011/0319051 A1 | 12/2011 | Reitnour |
| 2012/0002791 A1* | 1/2012 | Kraus .................. A61B 5/0022 379/37 |
| 2012/0071129 A1 | 3/2012 | Haney |
| 2012/0092161 A1 | 4/2012 | West |
| 2012/0130753 A1 | 5/2012 | Lewis |
| 2012/0200411 A1* | 8/2012 | Best .................. G08G 1/096775 340/539.13 |
| 2012/0253551 A1 | 10/2012 | Halimi et al. |
| 2012/0258681 A1 | 10/2012 | Hanover |
| 2012/0282887 A1 | 11/2012 | Khoo et al. |
| 2012/0309409 A1 | 12/2012 | Grosman et al. |
| 2012/0329420 A1* | 12/2012 | Zotti .................. H04M 1/72541 455/404.2 |
| 2013/0005363 A1 | 1/2013 | Tester |
| 2013/0012154 A1 | 1/2013 | Ramos |
| 2013/0040600 A1* | 2/2013 | Reitnour .................. G01S 19/17 455/404.2 |
| 2013/0085668 A1 | 4/2013 | Roberts, Sr. et al. |
| 2013/0091452 A1* | 4/2013 | Sorden .................... G06F 3/048 715/771 |
| 2013/0099977 A1 | 4/2013 | Sheshadri et al. |
| 2013/0231137 A1 | 9/2013 | Hugie et al. |
| 2013/0237174 A1 | 9/2013 | Gusikhin et al. |
| 2013/0241726 A1 | 9/2013 | Hunter et al. |
| 2013/0246397 A1 | 9/2013 | Farver et al. |
| 2013/0316751 A1 | 11/2013 | Rao |
| 2013/0324166 A1 | 12/2013 | Mian et al. |
| 2013/0332007 A1 | 12/2013 | Louboutin |
| 2014/0011471 A1 | 1/2014 | Khosla et al. |
| 2014/0017146 A1 | 1/2014 | Sakamoto et al. |
| 2014/0031000 A1 | 1/2014 | Hanover |
| 2014/0132393 A1 | 5/2014 | Evans |
| 2014/0143801 A1 | 5/2014 | Russell et al. |
| 2014/0172873 A1 | 6/2014 | Varoglu et al. |
| 2015/0163626 A1* | 6/2015 | Zimmer .................. H04W 4/22 455/404.2 |

FOREIGN PATENT DOCUMENTS

| | | |
|---|---|---|
| WO | WO 2014/062147 A1 | 4/2014 |
| WO | WO 2014/072910 A1 | 5/2014 |
| WO | WO 2014/075070 A2 | 5/2014 |
| WO | WO 2014/096920 A1 | 6/2014 |

OTHER PUBLICATIONS

"Business & Corporations—Personal Security App—EmergenSee", http://www.emergensee.com/be-emergensee-safe/business-corporations, Oct. 31, 2014, 3 pages.

WIPO, PCT/US2014/061389, "International Search Report," Feb. 5, 2015, 2 pages.

WIPO, PCT/US2014/061389, "Writtem Opinion of the International Searching Authority," Feb. 5, 2015, 14 pages.

U.S. Appl. No. 14/204,084, filed Mar. 11, 2014, South.

Campbell, M., "Apple invention uses iPhone and wearable sensors to monitor activities, automate alarms," http://appleinsider.com/articles/14/06/19/apple- invention-uses-iphone-and-wearable-sensor, Jun. 19, 2014, pp. 1-10.

Roppolo, M., "What to expect at Goggle I/O 2014 developers conference," http://www.cbsnews.com/news/google-io-2014-rumor-roundup-what-to-expect/ , Jun. 21, 2014, pp. 1-4.

* cited by examiner

INTERACTIVE EMERGENCY INFORMATION AND IDENTIFICATION

FIELD

This application relates generally to data processing and, more specifically, to systems and methods for interactive emergency information and identification.

BACKGROUND

During a catastrophic event people rely on TV, radio and other forms or "media" related devices for immediate information on all aspects of the event. This includes the locations, people involved, responding agencies and victims. With this the average system has no "immediate" flow of information of the event to the individual person, employee or management in a controlled environment in the vicinity of the event. However, timely response in emergency situations depends on accurate and up-to-date information about the emergency situation itself, affected persons, and their state. Prompt acquisition and exchange of such data can be essential in such situations. Audiovisual surveillance systems may require thorough analysis for detecting all affected persons. Additionally, deployment of surveillance systems is associated with high investments and, generally, negatively perceived by the public. Historically, state, local, and federal agencies use systems based on radio communications (to include mobile data terminals (MDTs) in emergency response vehicles). They rely on witnesses on scene to provide "approximate data" for correlation to the event that has just occurred.

Moreover, conventional systems cannot provide personalized information and guidelines to individuals affected by an emergency situation or request and receive information related to the emergency situation from the individuals.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for interactive emergency information and identification. The interactive emergency information and identification system may comprise a processor and a database. The processor may be configured to receive a notification about an emergency situation. The notification may include a location associated with the emergency situation. Based on the location, a geo-fence may be defined. The geo-fence may be a physical area of varying radii around the location. The geo-fence may be pre-defined by a user of the interactive emergency information and identification system or, alternatively, may be defined by the processor based on the notification and other information retrieved in relation to the emergency situation. Additionally, location information associated with a location of a plurality of user devices may be received. Location of the user devices may be determined based on multilateration of radio signals between radio towers, triangulation of a GPS signal associated with each of the plurality of user devices, WiFi positioning, Bluetooth sensor signals, and so forth. The user devices are associated with individuals, so a position of an individual within the geo-fence can be determined based on the location information. The position may include a proximity zone associated with the position of the individual. The individual may be informed about the emergency situation and provided with a functionality to give feedback via a user interface associated with the user device. The feedback may be received from the individual by the processor. The feedback may include a request for help, a statement that no help is required, an assessment of the emergency situation, audio data, video data, text data, and so forth. Additionally, the processor may be configured to transmit the feedback to one or more emergency agencies.

The database may be communicatively coupled to the processor and configured to store at least the notification, the position of the individual, and the feedback.

In some embodiments, the processor may be further configured to provide emergency instructions associated with the emergency situation. The emergency instructions may be based on an emergency action plan associated with the emergency situation, and/or other data.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Interactive emergency information and identification systems and methods are described herein. In case of an emergency situation, such as a shooting, a terrorist attack, and so forth, individuals in a proximity to the location of the emergency situation may be determined using the location services of their user devices (e.g., smart phone or a tablet PC). The individuals within a certain distance from the location of the emergency situation may be informed about the emergency situation and requested to provide feedback based on different platforms. The feedback may be provided by B2B partners, state or local entities, and/or one or more civilian level users. Civilian level users or individuals may provide information concerning their condition, safety, and/or whatever information they may have concerning the emergency situation. Audio, video, and/or text data may be received from the individuals via their devices. For example, a photo of an active shooter or a video of a terrorist attack may be received. The received feedback may be forwarded to law enforcement or other appropriate agencies.

Additionally, data from various sources, such as local Emergency Plan Actions or specific plans, may be retrieved. Emergency instructions relative to the emergency situation affecting the individuals may be extracted from the data and provided to the individuals via a user interface of their devices. For example, emergency instructions may be provided in a graphical form as directions on a map displayed on the user device. At the same time, current position of the individual may be displayed on the map.

In some embodiments, an interactive emergency information and identification system may be used to request assistance in an emergency situation. Thus, a user may send an emergency notification and/or additional data related to the emergency via the user device. The user geographical position may be determined, and local emergency agencies may be informed about the emergency situation affecting the user. Additionally, emergency instructions may be retrieved based on the geographical position of the user and provided to the user via a graphical interface of the user device.

Figure 1:
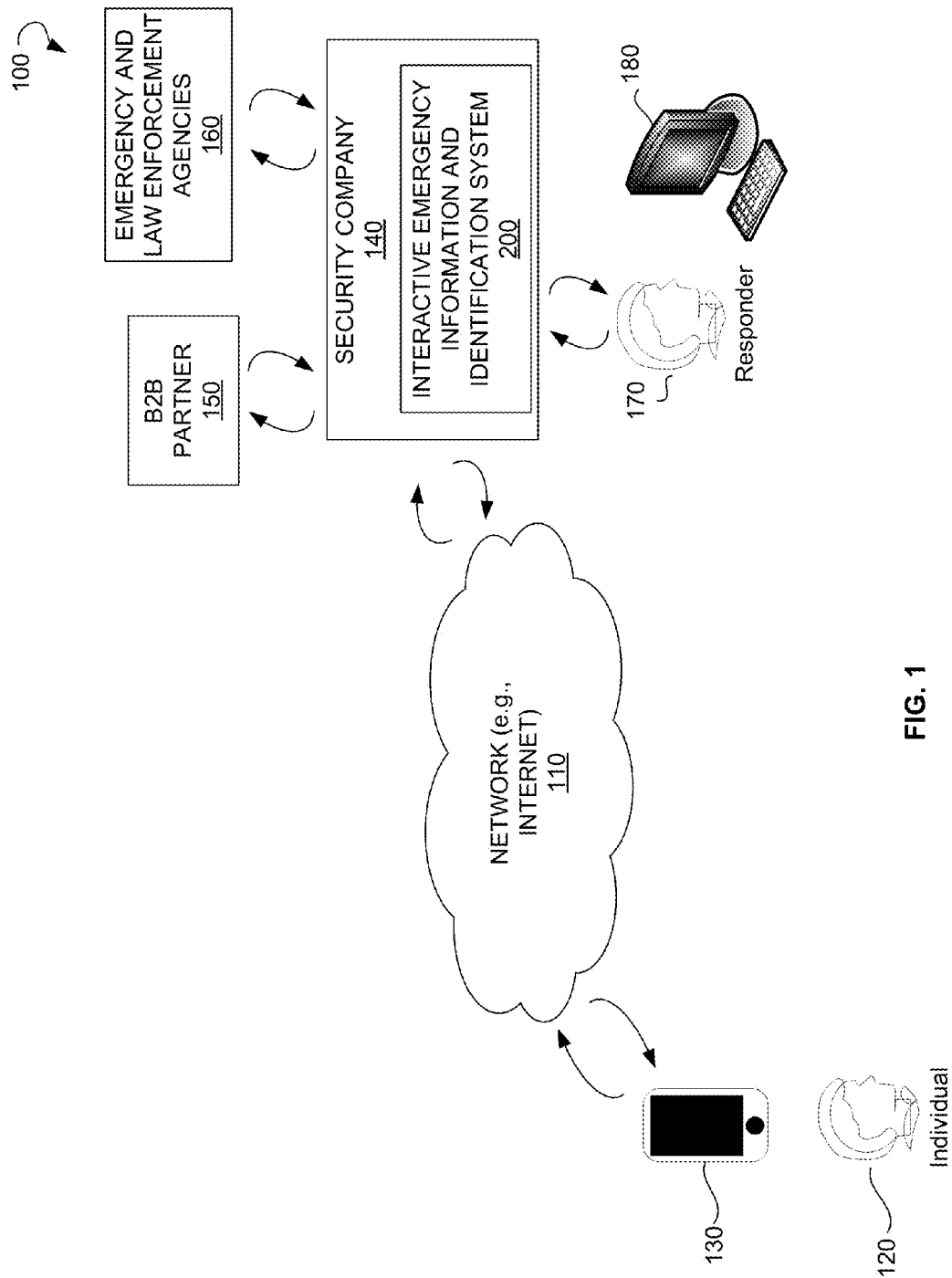
FIG. 1 illustrates an environment within which interactive emergency information and identification systems and methods can be implemented, in accordance to some embodiments.

Referring now to the drawings, FIG. 1 illustrates an environment 100 within which the interactive emergency information and identification systems and methods can be implemented. The environment 100 may include a network 110, an individual 120, a user device 130, a security company 140, a B2B partner 150, emergency and law enforcement agencies 160, such as a rescue service, fire emergency, and FBI, an interactive emergency information and identification system 200, a responder 170, and a work station 180. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may be a network of data processing nodes that are interconnected for the purpose of data communication.

The user device 130 may include a mobile telephone, a computer, a lap top, a smart phone, a tablet PC, and so forth. The user device 130, in some example embodiments, may include a Graphical User Interface (GUI) for displaying the user interface associated with the interactive emergency information and identification system 200. The user device 130 may also include a mobile transceiver assembly that may be used to determine a location of the user device. Determining the location may be enabled by employment of a GPS receiver, WiFi receiver, and/or Bluetooth receiver.

The individual 120 may be a bearer of the user device 130 who may interact with the interactive emergency information and identification system 200 and/or the responder 170 via a GUI. The responder 170 may communicate with the interactive emergency information and identification system 200 via the work station 180 or otherwise.

The interactive emergency information and identification system 200 may be operated by a security company 140 and may communicate with a B2B partner to exchange data related to an emergency situation and user contracts. Additionally, the interactive emergency information and identification system 200 may communicate with emergency and law enforcement agencies 160, for example, rescue service, fire emergency, FBI, governmental operations center, and so forth. Thus, the interactive emergency information and identification system 200 may receive notifications associated with emergency situations, emergency action plans, and other data from the emergency and law enforcement agencies 160. Additionally, the interactive emergency information and identification system 200 may transmit information about one or more individuals in proximity to the location of the emergency situation as well as audio, video, and/or text data received from the individual 120 to the emergency and law enforcement agencies 160.

Figure 2:
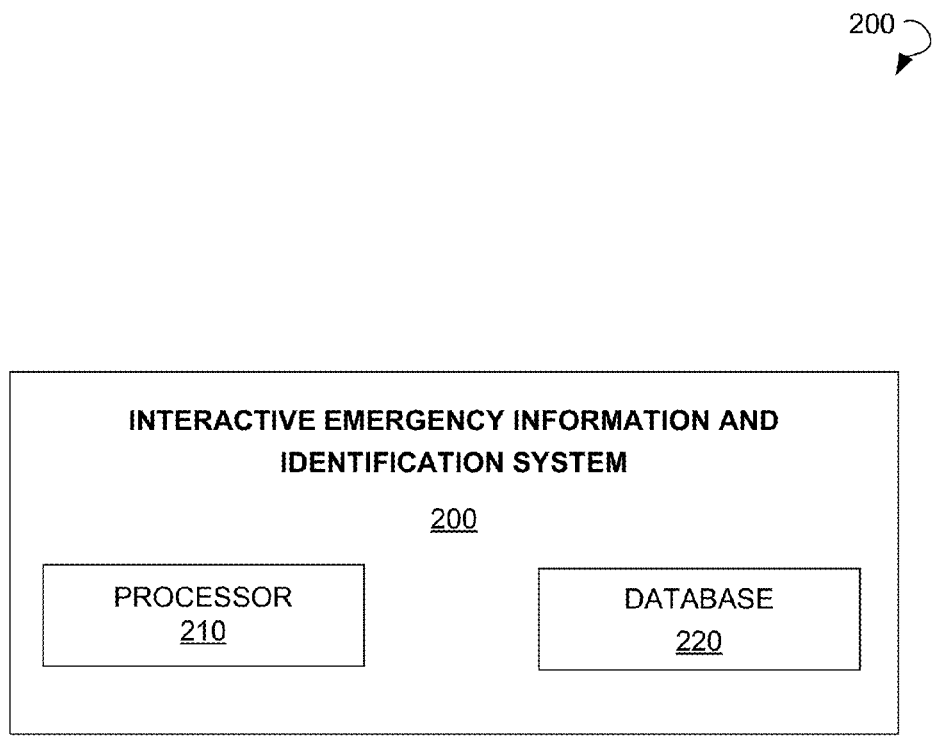
FIG. 2 is a block diagram showing various modules of the interactive emergency information and identification system, in accordance with certain embodiments.

FIG. 2 is a block diagram showing various modules of the interactive emergency information and identification system 200, in accordance with certain embodiments. The system 200 may comprise a processor 210 and a database 220. The processor 210 may include a programmable processor, such as a microcontroller, central processing unit (CPU), and so forth. In other embodiments, the processor 210 may include an application-specific integrated circuit (ASIC) or programmable logic array (PLA), such as a field programmable gate array (FPGA), designed to implement the functions performed by the system 200. Thus, the processor 210 may receive a notification concerning an emergency situation. The notification may include a location of the emergency situation and may be received from an emergency or law enforcement agency, one or more users of the system 200, and so forth. The processor 210 may define a geo-fence associated with the location of the emergency situation. The geo-fence may be a physical area of varying radius around the location. The radius may be predefined by a user, specified by an operator of the system 200, recommended by an emergency or law enforcement agency, determined based on a type and/or severity of the emergency situation. Additionally, the geo-fence may include one or more proximity zones being concentric circles of varying radii around the location within the geo-fence and representing the proximity to the location of the emergency situation.

The processor 210 may receive location information associated with locations of user devices. The location information may be received based on the defined geo-fence. Since the user devices are associated with individuals, the processor 210 may determine a position of an individual within the geo-fence based on the location information. The position may include a proximity zone associated with the position of the individual.

The processor 210 may inform the individual about the emergency situation via a user interface of the user device. Additionally, the individual may be provided with a functionality to give feedback related to the emergency situation. The feedback may be received by the processor 210 and may include a request for help, a statement that no help is required, an assessment of the emergency situation, audio information, video information, text information on the emergency situation, and so forth.

Notification about the emergency situation, location of the emergency situation, individuals located in proximity to the emergency situation, and feedback of the individuals may be stored in the database 220 and may be accessible for an operator of the system 200, one or more responders, representatives of emergency or law enforcement agencies, and so forth.

Figure 3:
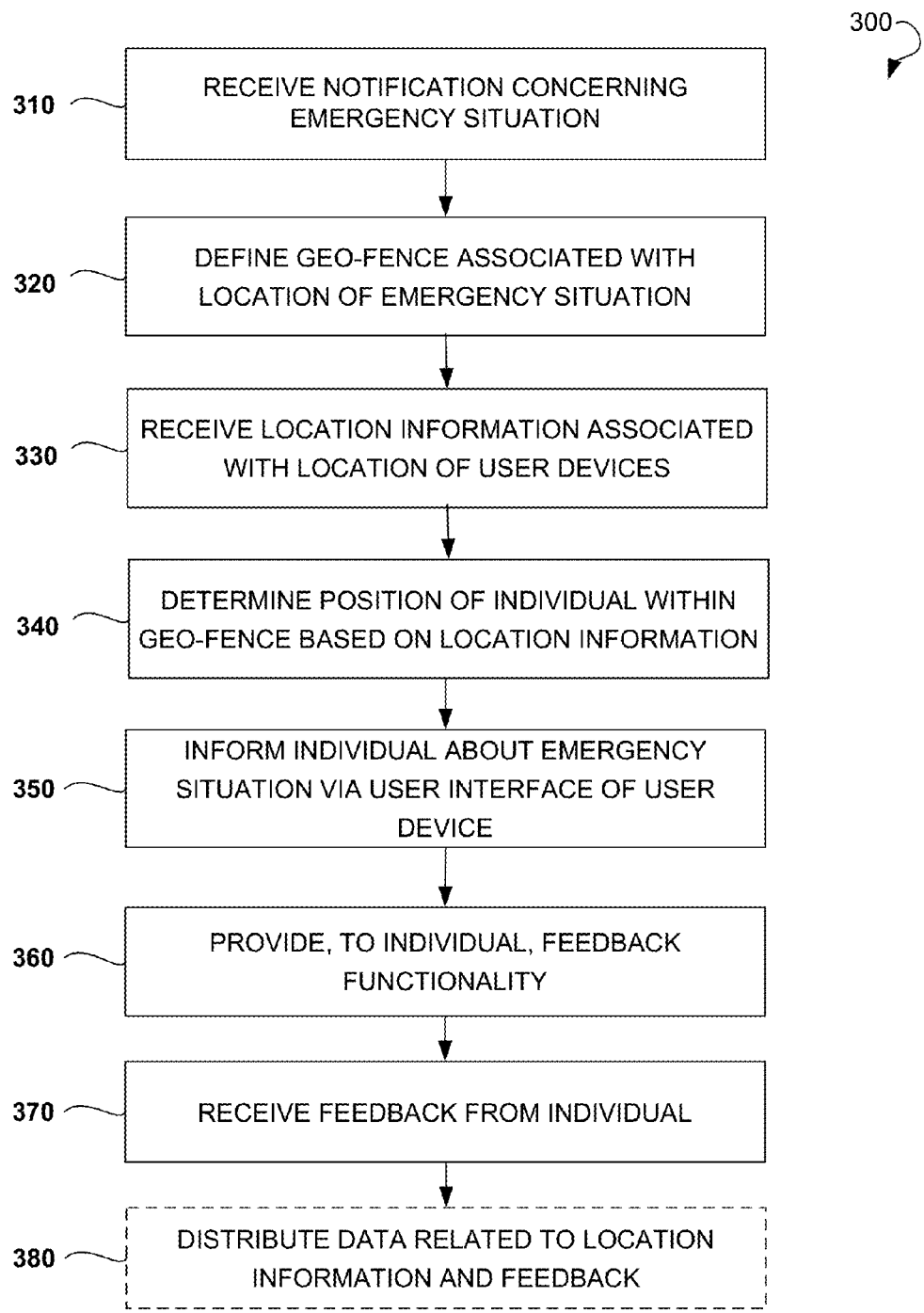
FIG. 3 is a flow chart illustrating an interactive emergency information and identification method, in accordance with some example embodiments.

FIG. 3 is a flow chart illustrating an interactive emergency information and identification method 300, in accordance with some example embodiments. The method 300 may be performed by logic that may comprise hardware (e.g., dedicated logic, programmable logic, and microcode), software (such as software run on a general-purpose computer system or a dedicated machine), or a combination of both. In one example embodiment, the processing logic resides at the interactive emergency information and identification system 200, and the various elements of the system 200 can perform the method 300. It will be appreciated by one of ordinary skill that examples of the foregoing modules may be virtual, and instructions said to be executed by a module may, in fact, be retrieved and executed by software. Although various elements may be configured to perform some or all of the various operations described herein, fewer or more elements may be provided and still fall within the scope of various embodiments.

As shown in FIG. 3, the method 300 may commence at operation 310 with receiving a notification concerning an emergency situation. The emergency situation may include a terrorist attack, a shooting event, a bombing event, an earthquake, a flood, a fire, a hurricane, an accident, and other natural or man-made disasters. The notification may include a location of the emergency situation and/or its description, classification, type, action plan, and so forth.

At operation 320, a geo-fence for the emergency situation may be defined. The geo-fence may be defined automatically based on the description, classification, and/or type of the emergency situation. Alternatively, the geo-fence may be predefined by an individual whose user device interacts with the interactive emergency response system or by an operator of the interactive emergency information and identification system. The geo-fence may include two or more proximity zones. Zones may be differentiated based on proximity to the location of the emergency situation.

At operation 330, location information associated with the locations of user devices may be received. The location information may be determined via multilateration of radio signals between radio towers, triangulation of a GPS signal associated with each of the user devices, WiFi positioning, and Bluetooth sensor signals. The location information may be associated with the geo-fence. The user devices may include mobile phones, smart phones, tablet PCs, lap-tops, and so forth. The user devices may be carried by individuals and the location of user devices may indicate the individuals' locations. Based on the location information and the geo-fence, a position of an individual within the geo-fence may be determined at operation 340. The position may include a proximity zone associated with the individual.

At operation 350, the individual may be informed about the emergency situation via a user interface of the user device associated with the individual. The individual may be informed by a message displayed on a screen of the user device (for example, as a push message). In some embodiments, the message may depend on the proximity zone associated with the individual. Additionally, at operation 360, a functionality to give feedback may be provided to the individual via the user interface, and the feedback may be received at operation 370. Thus, information on the state of the individual may be requested. In such a way, the interactive emergency information and identification system may receive information on a number and state of individuals who are affected by the emergency situation. Moreover, audio, video, text, and other data related to the emergency situation may be received from the individual. The data may include, for example, a photo of a shooter in a shooting event, information on suspicious activity noticed by the individual, and so forth.

At optional operation 380, the data related to the feedback of the individual and location information may be distributed to corresponding agencies, B2B partners, and/or individual users. The volume and details of the data provided to B2B partners and users may depend on agreements and settings with these partners and/or users.

The data, also transmitted to corresponding agencies, may be used by them to facilitate emergency situation management and relief.

In some embodiments, emergency instructions associated with the emergency situation may be provided to the individual via the user interface (for example, as a text or as graphical instructions). The emergency instructions may be based on an emergency action plan associated with the emergency situation, instructions provided by corresponding agencies, and so forth. Additionally, the instructions may vary depending on the proximity zone associated with the position of the individual. For example, the individual within 10 meters of the shooter may receive instructions to stay in place, while the individual within a 50-100 meter proximity zone may receive instructions to move away from the shooter.

The current position of the individual may be continuously monitored and actions of the individual may be coordinated. For example, the individual may be informed that he is approaching a fire or moving away from a rescue team or informed about recommended moving directions.

In some embodiments, a user of the interactive emergency information and identification system may send an assistance request. The system may receive the request and provide assistance to the user. The assistance may include informational assistance, transmitting the assistance request to an emergency agency, first aid service, and so forth.

Figure 4:
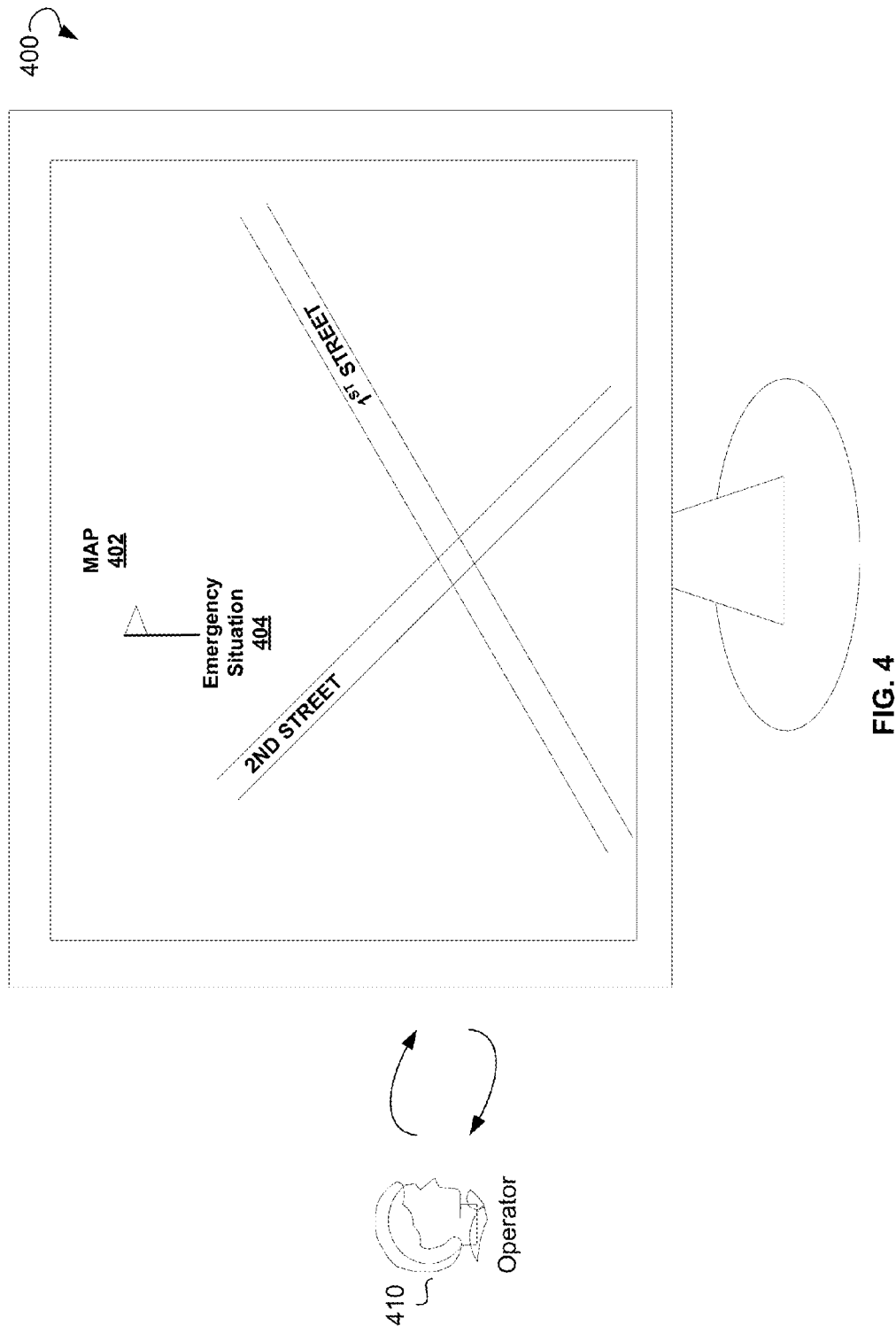
FIG. 4 illustrates a screenshot of an emergency situation, in accordance to some embodiments.

FIGS. 4-8 show example screens illustrating emergency situation information and identification. FIG. 4 illustrates an example screen 400 of an emergency situation from the administrator's point of view, in accordance to some embodiments. A notification about an emergency situation may be received by the interactive emergency information and identification system 200 from a corresponding emergency, government, or law enforcement agency, a user of the interactive emergency information and identification system, or another source. The notification may include data on a location 404 of the emergency situation. The location 404 of an emergency situation may be defined on a map 402 which may be displayed to an operator 410 via an administrative interface.

Figure 5:
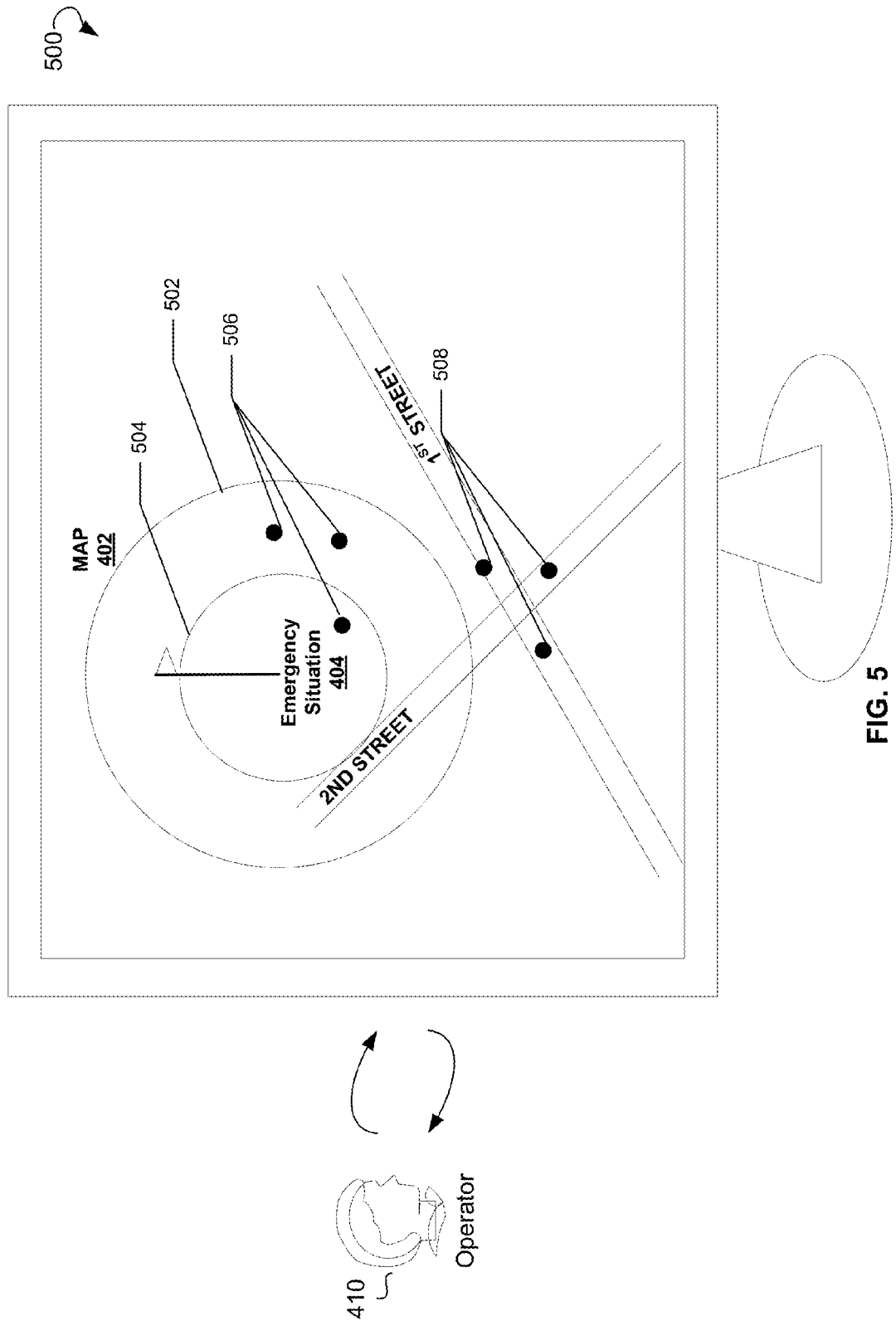
FIG. 5 illustrates a screenshot of defining a geo-fence of an emergency situation, in accordance to some embodiments.

A physical area of a certain radii may be defined as a geo-fence 502 of the emergency situation as shown by FIG. 5. The center of the geo-fence 502 may be the location 404 of the emergency situation. In some embodiments, several proximity zones may be defined within the geo-fence 502. For example, a proximity zone A (enclosed by a circle 504) may be a physical area with a radii of 50 meters. A proximity zone B may be, for example, a physical area between 50 and 100 meters radii from the location 404 (between the circles 504 and 502).

Location information associated with the location of user devices near the geo-fence 502 may be processed to determine the user devices within the geo-fence 502. The location of the user devices inside the geo-fence 502 may be taken as positions 506 of individuals inside the geo-fence 502. Additionally, user devices outside, but in proximity of the geo-fence 502 may be taken as positions 508 of individuals near the geo-fence 502. Screen 500 illustrates the positions 506 and 508 defined on the map 402 in relation to the location 404 of the emergency situation. Each of the positions 506 may be associated with a proximity zone within the geo-fence 502.

The screen 500 may be displayed to the operator 410 to visualize positions and movements of the individuals in relation to the emergency situation 404 in real time. Each of the positions 506, 508 may be accompanied by brief information associated with the individual. The information may be updated in real time and include name, age, state, phone number, and other data related to the individual.

In some embodiments, the operator 410 may connect and communicate with individuals, via the administrator's interface, for example, by phone, text messages, and so forth. The connection may be automated using the administrator's interface. Thus, the operator 410 may call one of the individuals without having to dial phone numbers, the operator 410 may simply activate an interface control element, and the system 200 will perform the connection automatically.

Figure 6:
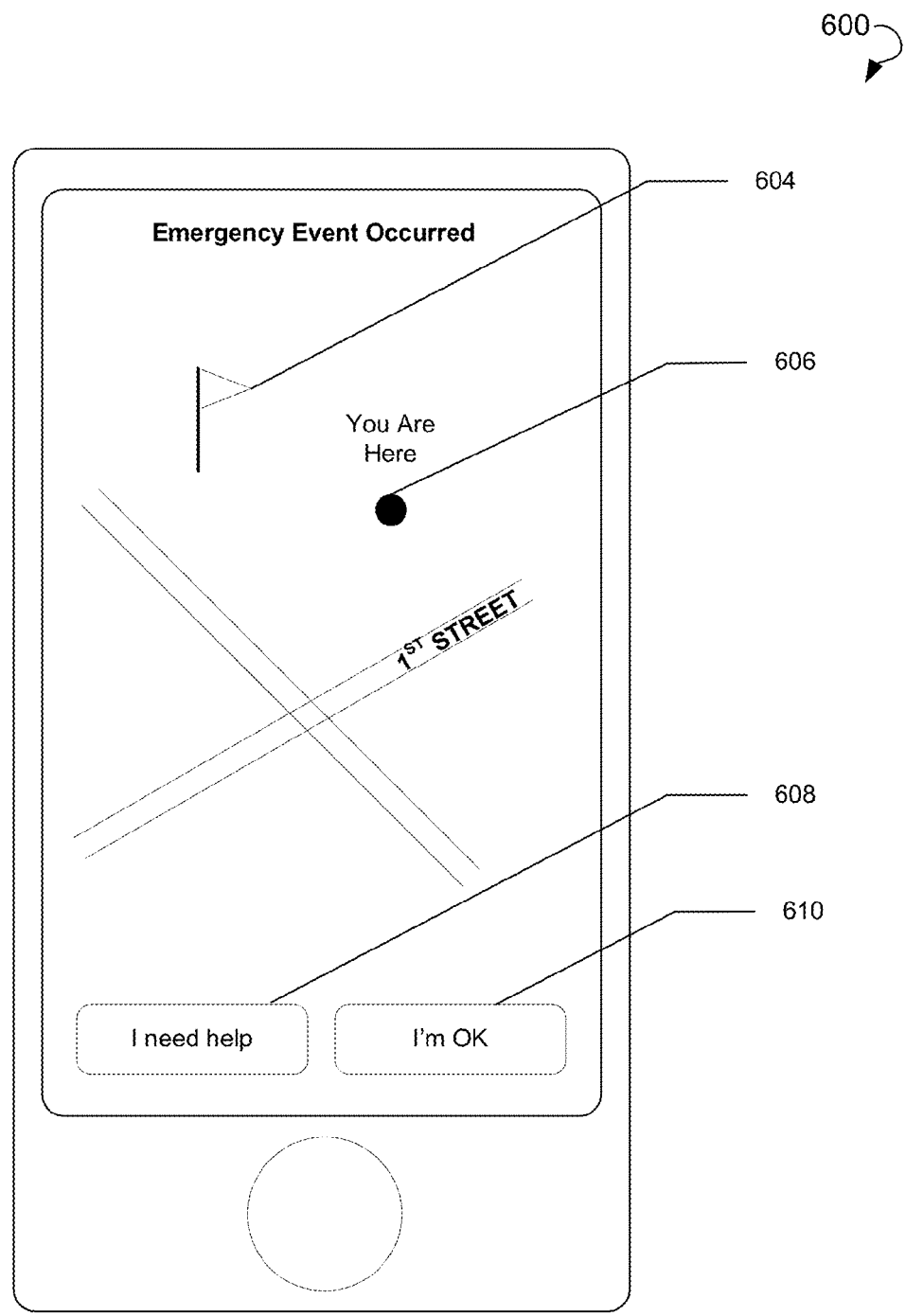
FIG. 6 illustrates a screenshot of an emergency situation notification, in accordance to some embodiments.

FIG. 6 illustrates an example screen 600 of an emergency situation notification shown on a user interface, in accordance to some embodiments. The notification may be shown on a display of a user device (for example, as a push message). The notification may include a location 604 of an emergency situation relative to a position of the individual 606. The location 604 and the position 606 may be shown on a map.

Additionally, a functionally to give feedback may be provided to the individual. Thus, the individual may send a request for help by activating an "I need help" button 608, or may define his state as satisfactory by activating an "I'm OK" button 610.

Figure 7:
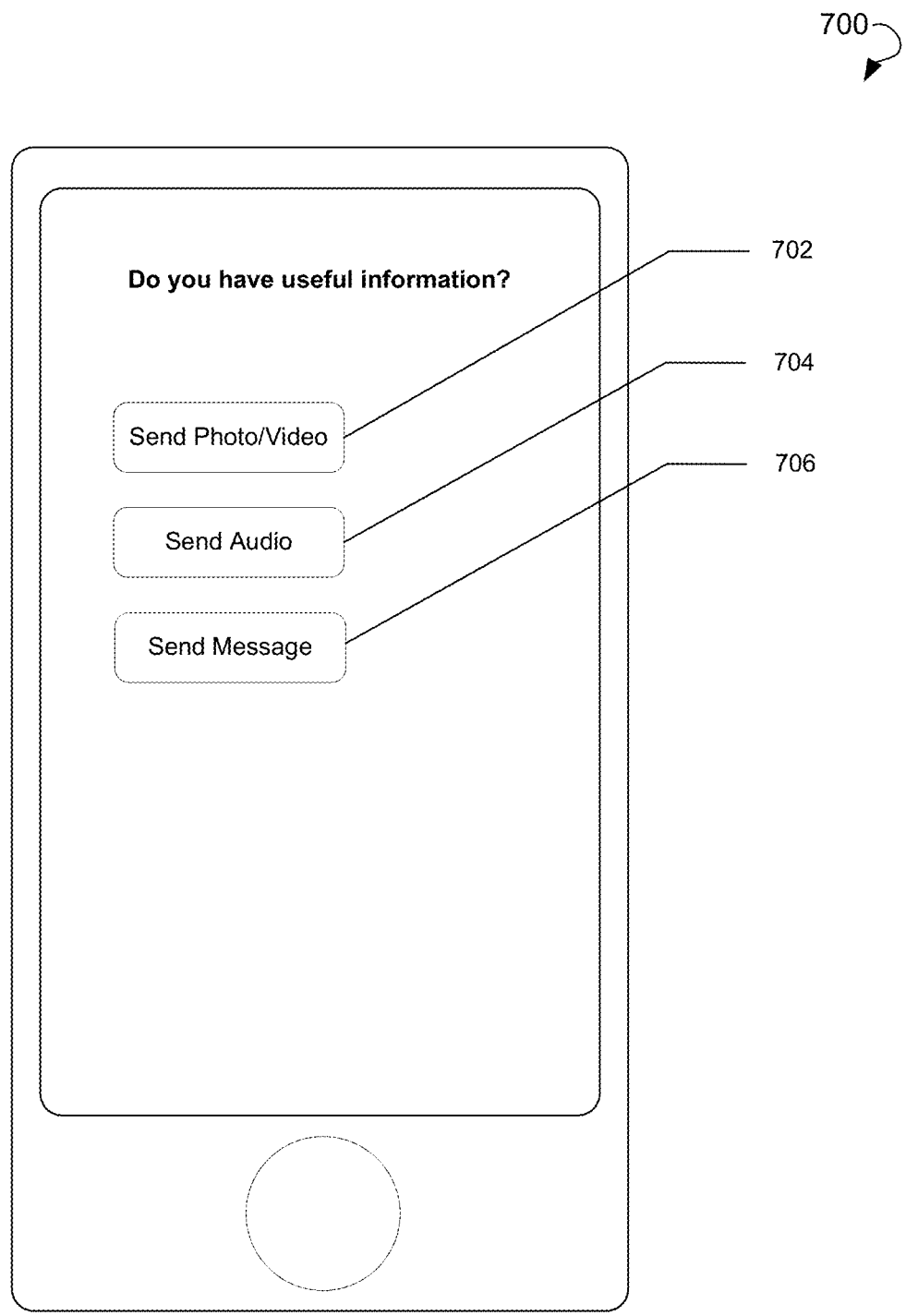
FIG. 7 illustrates a screenshot of providing emergency situation data, in accordance to some embodiments.

Furthermore, the interactive emergency information and identification system may provide a functionality to send data associated with the emergency situation. Thus, FIG. 7 illustrates an example screen 700 for providing emergency situation data, in accordance to some embodiments. The screen 700 may include at least "Send Photo/Video" 702, "Send Audio" 704, and "Send Message" 706 control elements. The data sent using 702-706 control elements may be transmitted to the interactive emergency information and identification system and then forwarded to appropriate agencies.

Figure 8:
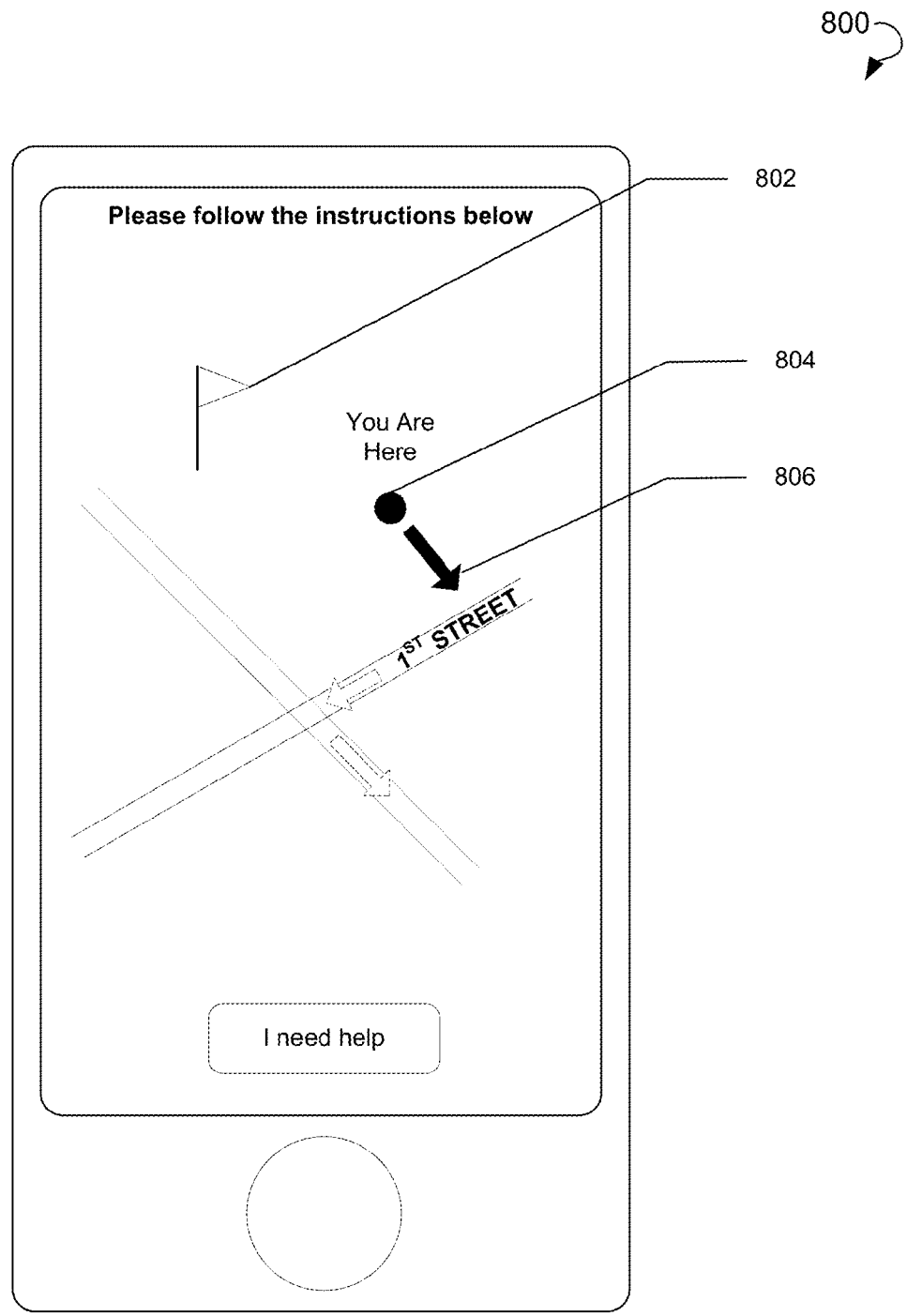
FIG. 8 illustrates a screenshot of providing emergency action instructions to the individual affected by the emergency situation, in accordance to some embodiments.

FIG. 8 illustrates an example screen 800 for providing emergency action instructions to an individual affected by the emergency situation, in accordance to some embodiments. The instructions may be provided via a user interface of a user device associated with the individual. In some embodiments, the instructions may be graphical directions 806 shown in relation to a location 802 of the emergency situation and a position 804 of the individual.

Alternatively, the emergency instructions may include text, audio, or video messages, or any other form of communication.

Data received from individuals (e.g. feedback to the status of the individuals) may be analyzed by the system 200. Based on the analysis, consolidated data representing safety of each individual may be generated. The consolidated data may be provided to an operator via an administrator's interface.

Figure 9:
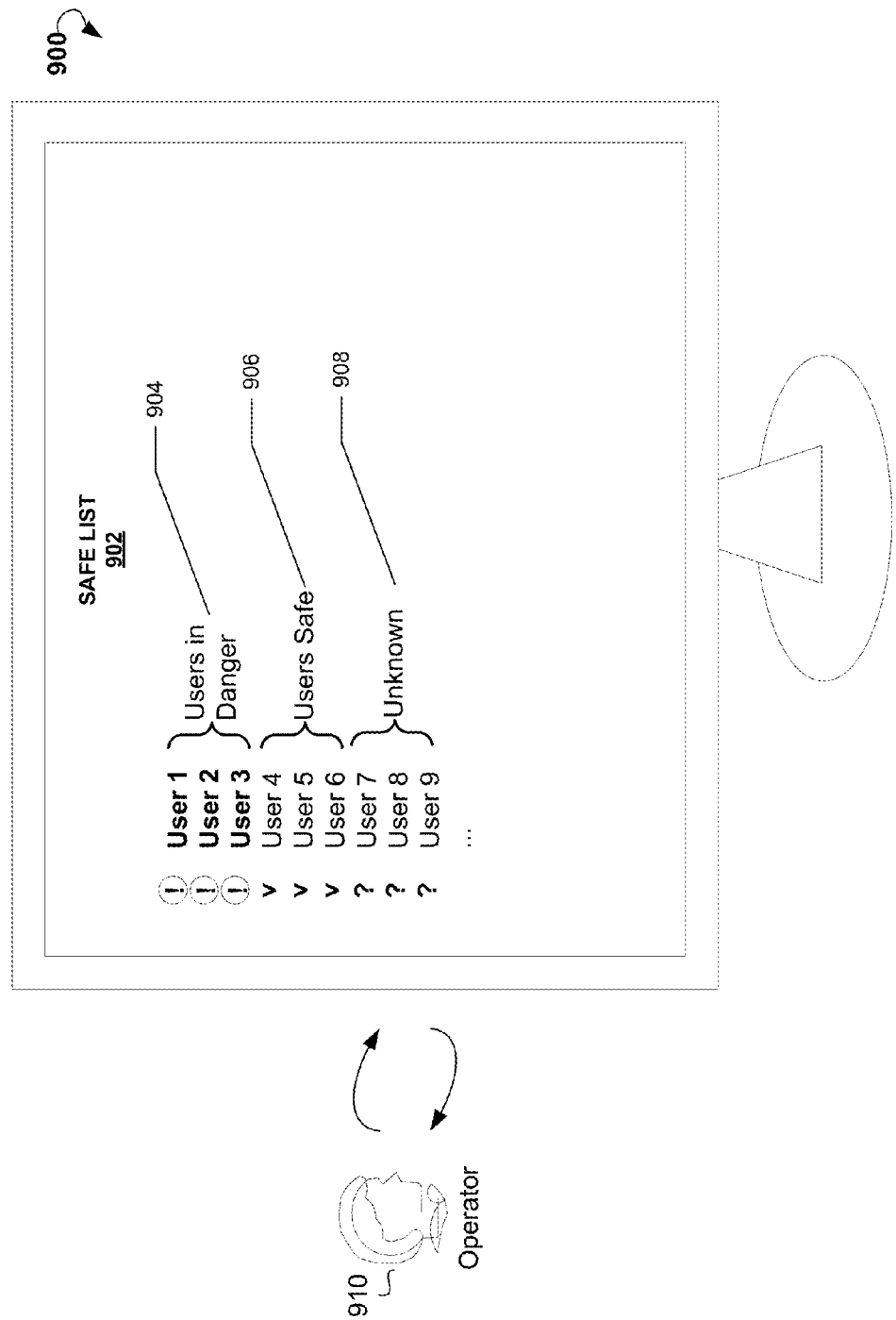
FIG. 9 illustrates a screenshot of providing individual safety information, in accordance to some embodiments.

An example screen 900 displaying reported safety status of the individuals in real time is illustrated by FIG. 9. A safe list 902 may be shown to an operator 902. The safe list 902 may graphically differentiate users of the system 200 (or individuals) with different safety statuses. For example, users in danger 904 may be highlighted by color, font size, special symbols, and so forth. Users safe 906 and users whose status is Unknown 908 may be indicated by other symbols, colors, and so forth.

Figure 10:
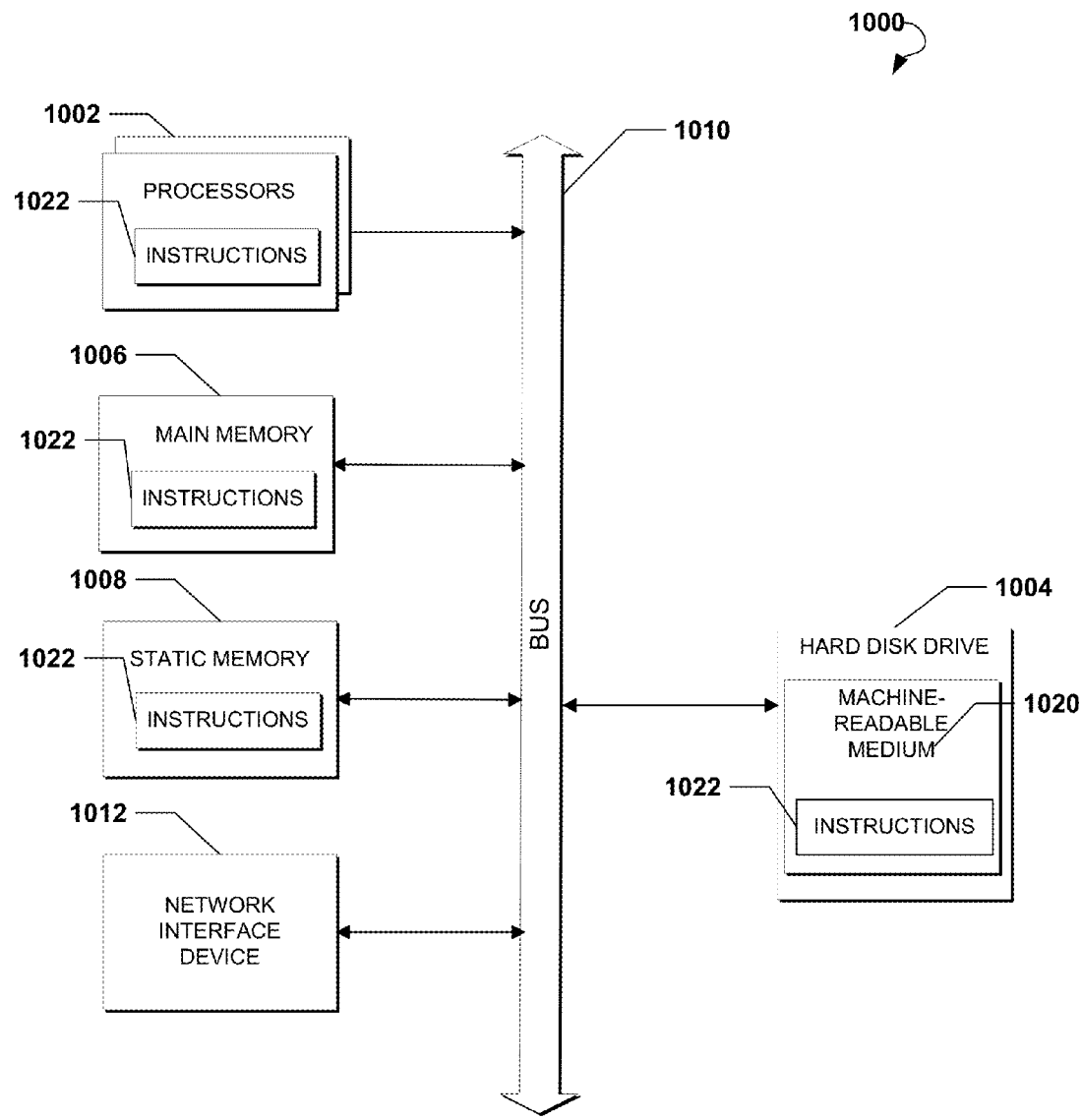
FIG. 10 shows a diagrammatic representation of a computing device for a machine in the exemplary electronic form of a computer system, within which a set of instructions for causing the machine to perform any one or more of the methodologies discussed herein can be executed.

FIG. 10 shows a diagrammatic representation of a computing device for a machine in the exemplary electronic form of a computer system 1000, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box (STB), a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002, a hard disk drive 1004, a main memory 1006 and a static memory 1008, which communicate with each other via a bus 1010. The computer system 1000 may also include a network interface device 1012. The hard disk drive 1004 may include a computer-readable medium 1020, which stores one or more sets of instructions 1022 embodying or utilized by any one or more of the methodologies or functions described herein. The instructions 1022 can also reside, completely or at least partially, within the main memory 1006 and/or within the processors 1002 during execution thereof by the computer system 1000. The main memory 1006 and the processors 1002 also constitute machine-readable media.

While the computer-readable medium 1020 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks (DVDs), RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, C++, C# or other compilers, assemblers, interpreters or other computer languages or platforms.

Thus, various interactive emergency information and identification systems and methods have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A computer-implemented method for interactive emergency information and identification, the method comprising:
    receiving, by a processor, a notification concerning an emergency situation, wherein the notification includes a location of the emergency situation;
    defining, by the processor, a geo-fence surrounding the location of the emergency situation, wherein the geofence includes a plurality of proximity zones representing physical areas of varying distances from the location of the emergency situation;
    receiving, by the processor, location information representing locations of a plurality of user devices, the user devices being respectively associated with individuals;
    determining, by the processor, positions of at least two user devices in the plurality of user devices within the geo-fence based on the location information, wherein the determining includes determining in which proximity zone the at least two user devices are located;
    informing, by the processor, at least two individuals about the emergency situation via user interfaces of the at least two user devices associated with the at least two individuals;
    providing, by the processor via the respective user interfaces of the at least two user devices associated with the at least two individuals, a functionality allowing the at least two individuals to provide respective current safety statuses of the at least two individuals;
    receiving, by the processor, the current safety statuses of the at least two individuals from the at least two user devices associated with the at least two individuals; and
    displaying, by the processor, the current safety statuses of the at least two individuals on a single screen of an administrator interface, wherein the displaying includes graphically differentiating the at least two individuals based on the respective current safety statuses of the at least two individuals.

2. The method of claim 1, wherein the geo-fence is a physical area of varying radii around the location of the emergency situation.

3. The method of claim 1, wherein the emergency situation includes one or more of a terrorist attack, a shooting event, a bombing event, an earthquake, a flood, a fire, a hurricane, and an accident.

4. The method of claim 1, wherein the locations of the plurality of user devices are determined based on at least one of multilateration of radio signals between radio towers, triangulation of a GPS signal associated with each of the plurality of user devices, WiFi positioning, and Bluetooth sensor signals.

5. The method of claim 1, further comprising: receiving, from at least one of the plurality of user devices within the geo-fence, one or more of the following: audio data, video data, and text data.

6. The method of claim 1, further comprising: providing, by the processor, emergency instructions associated with the emergency situation to the at least two individuals via the user interfaces of the at least two user devices associated with the at least two individuals.

7. The method of claim 6, wherein the emergency instructions are based on the proximity zone associated with the respective positions of the at least two individuals.

8. The method of claim 6, further comprising: coordinating actions of the at least two individuals based on the emergency instructions.

9. The method of claim 1, wherein the informing includes sending a push message to the at least two user devices associated with the at least two individuals.

10. The method of claim 1, further comprising:
    receiving, by the processor, an assistance request from at least one of the at least two user devices associated with the at least two individuals; and
    providing assistance to the individual associated with the assistance request, wherein the assistance includes one or more of transmitting informational assistance and transmitting the assistance request to one or more emergency agencies.

11. The method of claim 1, further comprising:
    providing, by the processor via the user interface of the at least two user devices associated with the at least two individuals, a functionality allowing the at least two individuals to provide feedback about the emergency situation; and
    receiving, by the processor, the feedback about the emergency situation from at least one of the at least two user devices associated with the at least two individuals.

12. The method of claim 1, further comprising determining positions of the at least two individuals associated with the at least two user devices based on the positions of the at least two user devices.

13. The method of claim 11, further comprising: transmitting the feedback to one or more emergency agencies.

14. The method of claim 11, wherein the feedback includes one or more of a positive request for help, a statement that no help is required, an assessment of the emergency situation, audio information, and video information.

15. The method of claim 11, further comprising:
    analyzing, by the processor, the received feedback together with feedback received from other individuals;

based on the analysis, generating, by the processor, consolidated data related to the received feedback and the feedback received from the other individuals; and providing, by the processor, the consolidated data to an operator via the administrator interface.

16. An interactive emergency information and identification system, the system comprising:

a processor configured to:
- receive a notification concerning an emergency situation, wherein the notification includes a location of the emergency situation;
- define a geo-fence surrounding the location of the emergency situation, wherein the geo-fence includes a plurality of proximity zones representing physical areas of varying distances from the location of the emergency situation;
- receive location information representing locations of a plurality of user devices, the user devices being respectively associated with individuals;
- determine positions of at least two user devices in the plurality of user devices within the geo-fence based on the location information, wherein the determination includes a determination of in which proximity zone the at least two user devices are located;
- inform at least two individuals about the emergency situation via user interfaces of the at least two user devices associated with the at least two individuals;
- provide, via the respective user interfaces of the at least two user devices associated with the at least two individuals, a first interactive element that when activated indicates that the respective individual is currently safe and a second interactive element that when activated indicates that the respective individual is currently unsafe, the first and second interactive elements allowing the at least two individuals to provide respective current safety statuses of the at least two individuals;
- receive the current safety statuses of the at least two individuals from the at least two user devices associated with the at least two individuals; and
- display the current safety statuses of the at least two individuals on a single screen of an administrator interface, wherein the displaying includes representing with a first display characteristic the individuals that provided a current safety status indicating that the individual is safe, representing with a second display characteristic the individuals that provided a current safety status indicating that the individual is unsafe, and representing with a third display characteristic the individuals for which a current safety status is unknown, the first, second, and third display characteristics being different; and a database communicatively coupled to the processor and configured to store at least the notification and the position information.

17. The system of claim 16, wherein the geo-fence is a physical area of varying radii around the location of the emergency situation.

18. The system of claim 16, wherein the processor is further configured to:
- receive, from at least one of the plurality of user devices within the geo-fence, one or more of the following: audio data, video data, and text data, and
- provide emergency instructions associated with the emergency situation to the at least two individuals via the user interfaces of the at least two user devices associated with the at least two individuals.

19. The system of claim 16, wherein the locations of the plurality of user devices are determined based on at least one of multilateration of radio signals between radio towers, triangulation of a GPS signal associated with each of the plurality of user devices, WiFi positioning, and Bluetooth sensor signals.

20. The interactive emergency information and identification system of claim 16, wherein the processor is further configured to:
- provide, via the user interface of the at least two user devices associated with the at least two individuals, a functionality allowing the at least two individuals to provide feedback about the emergency situation; and
- receive the feedback about the emergency situation from at least one of the at least two user devices associated with the at least two individuals.

21. The system of claim 20, wherein the processor is further configured to transmit the feedback to one or more emergency agencies.

22. The system of claim 20, wherein the feedback includes one or more of the following: a positive request for help, a statement that no help is required, an assessment of the emergency situation, audio data, video data, and text data.

23. The interactive emergency information and identification system of claim 16, wherein the processor is further configured to determine positions of the at least two individuals associated with the at least two user devices based on the positions of the at least two user devices.

24. A non-transitory computer-readable medium comprising instructions, which when executed by one or more processors, cause the following operations to be performed:
- receive a notification concerning an emergency situation, wherein the notification includes a location of the emergency situation;
- define a geo-fence surrounding the location of the emergency situation, wherein the geo-fence includes a plurality of proximity zones representing physical areas of varying distances from the location of the emergency situation;
- receive location information representing locations of a plurality of user devices, the user devices being respectively associated with individuals;
- determine positions of at least two user devices in the plurality of user devices within the geo-fence based on the location information, wherein the determination includes a determination of in which proximity zone the at least two user devices are located;
- inform at least two individuals about the emergency situation via user interfaces of the at least two user devices associated with the at least two individuals;
- provide, via the respective user interfaces of the at least two user devices associated with the at least two individuals, a functionality allowing the at least two individuals to provide respective current safety statuses of the at least two individuals;
- receive the current safety statuses of the at least two individuals from the at least two user devices associated with the at least two individuals; and
- display the current safety statuses of the at least two individuals on a single screen of an administrator interface, wherein the displaying includes graphically differentiating the at least two individuals based on the respective current safety statuses of the at least two individuals.

25. The non-transitory computer-readable medium of claim 24, wherein the instructions further cause the following operations to be performed:

provide, via the user interface of the at least two user devices associated with the least two individuals, a functionality allowing the at least two individuals to provide feedback about the emergency situation; and receive the feedback about the emergency situation from at least one of the at least two user devices associated with the at least two individuals.

26. The non-transitory computer-readable medium of claim 24, wherein the instructions further cause the following operation to be performed:

determine positions of the at least two individuals associated with the at least two user devices based on the positions of the at least two user devices.

* * * * *